United States Patent [19]
Lantos

[11] 3,714,181
[45] Jan. 30, 1973

[54] 2-ARYL-5,10-DIPHENYLPHENANTHRO(9,10-D)AZOLES

[75] Inventor: Ivan Lantos, Haifa, Israel

[73] Assignee: American Cyanamid Company, Stamford, Conn.

[22] Filed: Dec. 31, 1970

[21] Appl. No.: 103,285

[52] U.S. Cl. ........260/309.6, 260/307 R, 260/566 A, 252/301.3 R, 117/33.5 R, 117/33.5 T, 117/34, 117/33.3, 117/124 D, 116/288 Q, 116/47 Q

[51] Int. Cl. .............................................C07d 49/40

[58] Field of Search .......260/307, 309.2, 304; 26/1.5

[56] References Cited

UNITED STATES PATENTS

| | | | |
|---|---|---|---|
| 3,257,204 | 6/1966 | Sus | 96/1.5 |
| 3,279,918 | 10/1966 | Cassiers | 96/1.5 |

*Primary Examiner*—Harry I. Moatz
*Attorney*—Samuel Branch Walker

[57] ABSTRACT

A new class of phosphorescent and photochromic 2-aryl-5,10-diphenylphenanthro[9,10-d]azoles of the formula (1)

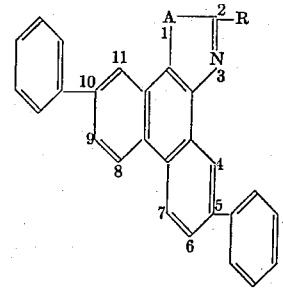

I wherein A is imino (—NH—) or oxygen (—O—), R is a carbocyclic aryl group of not more than 3 benzene rings (phenyl, biphenylyl, naphthyl), and which may carry inert substituents such as alkyl, alkoxy, halogen, nitro, etc; are useful in phosphorescent and photochromic compositions.

5 Claims, No Drawings

2-ARYL-5,10-DIPHENYLPHENANTHRO(9,10-D)AZOLES

RELATED APPLICATIONS

Canadian Pat. No. 746,257, Stamm, Brinen, Halverson and Hosterman, PHOTOCHROMIC POLYMER MATRIX, Nov. 15, 1966, and a corresponding U. S. Pat. No. 3,635,544, Jan. 18, 1972, Stamm Brinen, Halverson and Tennant (nee Hosterman), PHOTOCHROMIC POLYMER MATRIX, issued on Ser. No. 769,028 Oct. 21, 1968, which is a Continuation-in-Part of Ser. No. 332,752, Dec. 23, 1963; describe a photochromic filter using a polynuclear aromatic photochromic compound in a polymeric matrix free from residual monomer and oxygen.

The use of deuterated polycyclic aromatic compounds in photochromic filters is described in Canadian Pat. No. 781,707, Apr. 2, 1968.

The theory of single and double energy transfer is developed at length in N. J. Turro "Molecular photochemistry" W. A. Benjamin Inc., New York 1967. The energy diagram on page 129 and the transfer of excitation energy between insolated chromophores, such as through a mono-, di- or tri- -methylene bridge between 1-naphthalene and 9-anthracene, and the comparison of the spectra with 1-methylnaphthalene and 9-methylanthracene gives a good theoretical approach to energy transfer phenomena. A similar system is described for 1-methylnaphthalene and 4-methylbenzophenone, (pages 127 and 128).

This text discusses activation particularly from its significance in organic photoreactions. A table of triplet energies is given at page 132, which table is herein incorporated by reference.

The energy relationship of absorption is $$E_2 - E_1 = h\nu$$

where $E_2$ and $E_1$ are the energies of a single molecule in the final and initial states, $h$ is Planck's constant $(6.6254 \pm 0.0002 \times 10^{-27}$ erg. sec.). and $\nu$ is the frequency (sec.$^{-1}$), at which the absorption occurs.

The absorption is often expressed in wavelength $\lambda = c/\nu$ where $\lambda$ is the wavelength, often in angstroms (A) and $c$ is the velocity of light.

The absorption band is often expressed in wavenumbers $\bar{\nu} = 1/\lambda$, usually in reciprocal centimeters. This is the number of wavelengths per centimeter.

Frequently the physicist uses wavenumbers, but a spectroscopist often prefers wavelengths. As shown above, such units are reciprocal and readily converted. As illustrative:

CONVERSION TABLE

| $\lambda$ A | $\bar{\nu}$ cm$^{-1}$ | $(E_2 - E_1)$ K cal/mole | eV |
|---|---|---|---|
| 2,000 | 50,000 | 143.0 | 6.20 |
| 4,000 | 25,000 | 71.5 | 3.10 |
| 7,000 | 14,286 | 40.8 | 1.77 |
| 20,000 | 5,000 | 14.3 | 0.62 |

From original derivation the word photochromic refers to a color change from light, sometimes called phototropic. Originally light referred to electromagnetic radiation visible to the human eye, about 4,000 to 7,000 A, or 400 to 700 nanometers (nm.) or 0.4 to 0.7 microns, or 25,000 to 14,286 cm$^{-1}$; but historically the term light is frequently used to include adjacent regions of the electromagnetic spectrum.

For efficient use as a photochromic filter, the photochromic material in its matrix needs to have a high absorption coefficient for activating radiation to raise ground state molecules to an excited singlet, then an efficient rate of intersystem crossing from the singlet to the triplet state and finally a triplet state with a high extinction coefficient and preferably a long life. Whereas many organic molecules are excellent insofar as one or more of these criteria are concerned, it is unusual to find molecules which meet requirements in all three of these criteria.

It has now been discovered that when a compound of Formula I is incorporated in a non-opaque substrate, the resulting composition is photochromic and phosphorescent when irradiated with ultraviolet light.

Compounds I were A is imino can be made by reacting the corresponding 2,7-diphenylphenanthrenequinone (II) with ammonium acetate and an aromatic aldehyde (III) in glacial acetic acid according to the general procedure of J. Chem. Soc. 1941, 282.

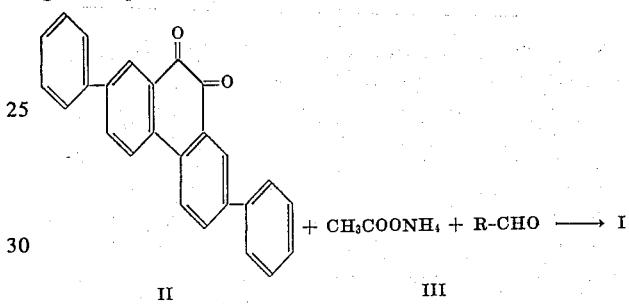

Compounds II can be obtained by oxidation of the precursor 2,7-diphenylphenanthrene, e.g., by chromic acid (C.A. 51, 16392) or by catalytic air oxidation (U.S. Pat. No. 2,956,065).

The compounds of Formula I can be considered as derivatives of phenanthro [9,10-d]oxazole (Ring Index, Second Edition, A.M. Patterson, L. T. Capell and D. F. Walker, American Chemical Society, Washington, D. C., 1960 number 4398), and 1H-phenanthro[9,10-d]imidazole (Ring Index 4452).

Previously known 2,7-diphenylphenanthrenes include 2,7-diphenylphenanthrene, 2,7-di-o-tolylphenanthrene and 2,7-di-p-tolylphenanthrene.

Compounds I where A is oxygen can be made by condensing the corresponding 2,7-diphenylphenanthrene-quinonemonoxime (IV) with an aromatic aldehyde (Formula III) according to the general procedure of J. Am. Chem. Soc. 64, 2567 (1942).

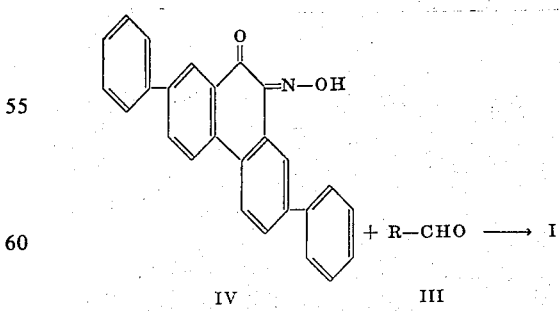

The 2,7-diphenylphenanthrenequinone-monoxime (IV) can be obtained by reaction of the corresponding 2,7-diphenylphenanthrenequinone (II) with hydroxylamine according to well-known procedures.

The aromatic aldehydes (III) having up to three benzenoid rings, including benzaldehyde, the biphenylcarboxaldehydes, the naphthaldehydes, the anthraldehydes, and the phenanthrenecarboxaldehydes. The aldehydes may be substituted by inert radicals such as alkyl, including methyl, ethyl, butyl, pentyl, dodecyl, etc.; alkenyl including vinyl, allyl, etc.; aryl, including phenyl, tolyl, naphthyl, etc.; arylalkyl, including benzyl, phenylpropyl, etc.; alkoxy, including methoxy, ethoxy, butoxy, decyloxy, etc.; acyl, including acetyl, benzoyl, etc.; halogen, including bromine, chlorine, iodine and fluorine; cyano; carboxy; nitro; acylamido, including acetamido, benzamido, etc.; dialkylamino, including dimethylamino, diethylamino, etc.; sulfonyl, including methylsulfonyl, phenylsulfonyl, etc.; silyl, including trimethylsilyl, etc.

Representative substituted aldehydes include o-, m- and p-methylbenzaldehyde, o-, m-, p-ethylbenzaldehyde, p-butylbenzaldehyde, p-pentylbenzaldehyde, 2,5-dimethylbenzaldehyde, 3,4,5-trimethylbenzaldehyde, m-vinylbenzaldehyde, p-allylbenzaldehyde, p-phenylbenzaldehyde, p-anisaldehyde, p-ethyoxybenzaldehyde, p-butoxybenzaldehyde, m-, o- and p-bromobenzaldehyde, o-, m- and p-chlorobenzaldehyde, m-iodobenzaldehyde, p-fluorobenzaldehyde, 3,5-dibromobenzaldehyde, 3,4-difluorobenzaldehyde, m-cyanobenzaldehyde, p-nitrobenzaldehyde, 2,4-dinitrobenzaldehyde, p-acetylbenzaldehyde, p-benzoylbenzaldehyde, p-acetamidobenzaldehyde, p-diethylaminobenzaldehyde, p-ethylsulfonylbenzaldehyde, p-phenylsulfonylbenzaldehyde, m-(trimethylsilyl)benzaldehyde, o-(3-phenylpropyl)benzaldehyde, m-benzyloxybenzaldehyde, 4,5-dimethoxy-1-naphthaldehyde, 2-methyl-1-naphthaldehyde, 1-bromo-2-naphthaldehyde, 2-nitro-1-naphthaldehyde, 4-methoxy-1-anthraldehyde, 4-methyl-1-anthraldehyde, 9,10-diphenyl-2-anthraldehyde, 10-butyl-9-anthraldehyde, 10-chloro-9-anthraldehyde, 3,4-dimethoxy-9-phenanthrenecarboxaldehyde, etc.

The compounds of this invention may be incorporated in non-opaque substrates capable of transmitting light in the range of 200 to 2,000 nanometers. The nature of the substrate may vary considerably over a broad class of compositions ranging from fluids to solids. The solids may be either crystalline or amorphous, among the most suitable being glasses and polymeric materials.

The glasses include low temperature glasses derived from organic solvents, such as 2-methyltetrahydrofuran, methylcyclohexane, and ether-pentane-alcohol; inorganic glasses such as phosphate glasses and borate glasses are also suitable. When liquid substrates are used, the life time of the triplet level is usually short, so that the photochromic effect can be detected only instrumentally.

The polymeric materials which may be used in this invention include a wide range of polymeric materials which exist today. For many purposes, the polymeric material must have optical transparency. A lack of color is also desirable. The polymeric materials include thermoplastics such as polyacrylates, polymethacrylates, cellulose acetate, cellulose propionate, cellulose acetate-butyrate, cellulose nitrate, ethyl cellulose, polycarbonates, polyacrylonitrile, polyamines, polystyrene, poly(methylstyrenes), poly(chloromethylstyrenes), poly(styrene-butadiene), poly(vinyl acetals), poly(vinyl chloride), poly(vinyl butyral), poly(vinyl formal), chlorinated polyethers and silicones; and thermosetting resins such as phenol-formaldehyde condensates, melamineformaldehyde condensates, polyester-styrene combinations, polyurethanes, epoxies, and copolymers and mixtures thereof.

The photochromic material is uniformly dispersed throughout the plastic matrix. This can be done by adding the compound to the monomer or monomers followed by polymerization; by dissolving the polymer and photochromic compound in a solvent and casting a rigid sheet, film or other form; by milling the photochromic combination of compounds with the polymeric material, etc. The photochromic compound can also be applied to the formed plastic article.

The photochromic effect is a function of the concentration of the photochromic compound, the thickness of the substrate and the intensity of the exciting radiation. Given adequate light intensity, the effect increases with increasing concentration and also increases with increasing thickness. For a given concentration and thickness, the effect increases with increasing light intensity up to the saturation value.

The amount of the photochromic compound to be used in the compositions of the invention may range from 0.0001 to 2.0 percent based on the amount of non-opaque substrate. In normal practice, at least 0.0001 percent, preferably at least 0.05 percent of the photochromic compound is employed.

For maximum lifetime, the substrate is free from unreacted monomer and free oxygen as described in Stamm et al. supra. The compounds are converted to a triplet absorption state, and triplet molecules are very reactive.

The compositions of this invention have many uses, such as in sunglasses, welding goggles, skylights, automobile windows and windshields, windows for building and dwellings, windows for space vehicles and aircraft, paints and surface coatings for novelty effects, energy measuring devices, etc.

EXAMPLE 1

2,5,10-Triphenyl-1H-phenanthro[9,10-d]imidazole

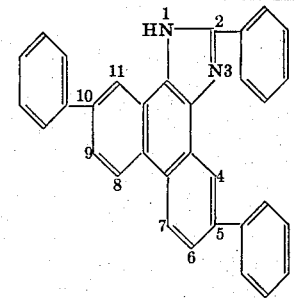

To a solution of 4 g. ammonium acetate in 10 ml glacial acetic acid at 85°C., is added 0.7 g. 2,7-diphenylphenanthrenequinone, heated to reflux temperature, then 0.9 g. benzaldehyde is added. The mixture is refluxed for 30 minutes. The precipitate obtained by cooling the mixture is recrystallized from chlorobenzene. The product, 2,5,10-triphenyl-1H-phenanthro[9,10-d]imidazole, melts at 360°–362°.

Calculated for $C_{33}H_{22}N_2$: N, 6.27.
Found: N, 6.19.

2,7-diphenylphenanthrenequinone may be prepared by dissolving 2.0 g. 2,7-diphenylphenanthrene [J. Org. Chem. 26, 2662 (1961)] in 100 ml nitrobenzene at 90°C. A solution of 1.5 g. chromic anhydride in 25 ml hot glacial acetic acid is added over a period of about 15 minutes. The mixture is heated at 90°–92°C. for 1 hour and steam distilled to remove nitrobenzene. The precipitate is recrystallized from dimethylformamide. The 2,7-diphenylphenanthrenequinone thus obtained melts at 282°–284°C.

EXAMPLE 2

2-Phenyl-5,10-bis(3-hexylphenyl)-1H-penanthro[9,10-d]imidazole

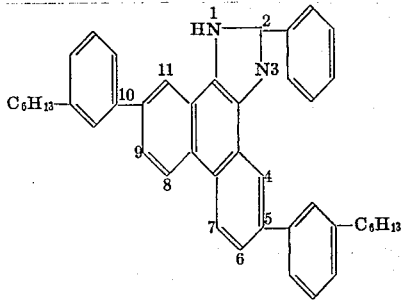

2.2 g. benzaldehyde is added to a solution of 31.0 g. ammonium acetate and 8.0 g. 2,7-bis(3-hexylphenyl)-phenanthrenequinone in 200 ml glacial acetic acid at 85°C. The mixture is refluxed for 1 hour, cooled, diluted with water to a volume of 500 ml and filtered. The product, 2-phenyl-5,10-bis(3-hexylphenyl)-1H-phenanthro[9,10-d]imidazole, is purified by chromatography.

The 2,7-bis(3-hexylphenyl)phenanthrenequinone may be prepared by oxidation of 2,7-(3-hexylphenyl)phenanthrene from the Grignard reaction of 2,7-phenanthrylenedilithium with 3-hexyl-2-cyclohexen-1-one, obtained by reaction of 3-ethoxy-2-cyclohexen-1-one (J. Am. Chem. Soc. 70, 2175) with hexylmagnesium bromide.

EXAMPLE 3

2,5,10-Triphenylphenanthro[9,10-d]oxazole

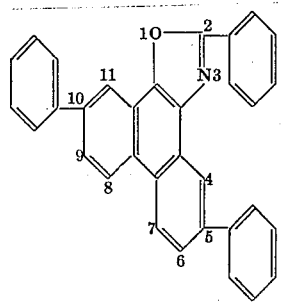

A mixture of 0.4 g. 2,7-diphenylphenanthrenequinonemonoxime, 10 g. benzaldehyde, and 0.5 g. piperidine is heated at 160°C. for 4–5 hours. The precipitate obtained is chromatographed on alumina using a mixture of benzene and chloroform as the eluent. The product is 2,5,10-triphenylphenanthro[9,10-d]oxazole.

The 2,7-diphenylphenanthrenequinone-monoxime may be obtained by the reaction of 2,7-diphenylphenanthrenequinone with hydroxylamine.

EXAMPLE 4

The products of Examples 1–3 are each separately dissolved in tetrahydrofuran and the solutions are frozen at the temperature of liquid nitrogen (77°K.). The frozen solutions were irradiated with ultraviolet light and the colors of the resultant phosphorescence were noted. The wavelengths of peak emission were also measured instrumentally.

Results are shown in Table I.

TABLE I

Phosphorescence

| Product | Color | Emission Peaks | Half Lifetime |
|---|---|---|---|
| Example 1 | green | 490 nm<br>523<br>569 | 4.8 sec. |
| Example 2 | green | 490<br>525<br>570 | 4.7 |
| Example 3 | yellow-green | — | — |

EXAMPLE 5

Frozen solutions (77°K.) of the products of Examples 1–3 in tetrahydrofuran were placed in the cell of an electron spin resonance spectrometer. Spectrophotometric curves and electron spin resonance intensities ($\epsilon$) epsilon, in liters per mol centimeter of the frozen samples were measured simultaneously before and after irradiation with UV light.

TABLE II

Photochromism

| Product | Color Change | Absorption Maxima | Intensity,$\epsilon$ |
|---|---|---|---|
| Ex. 1 | colorless → red-blue | 490 nm<br>526<br>563 | 7,500<br>20,000<br>90,000 |
| Ex. 2 | colorless → red-blue | 490<br>527<br>563 | 8,000<br>20,000<br>94,000 |
| Ex. 3 | colorless → blue | | |

The reaction of phenanthraquinones to make phenanthro[9,10-d]imidazoles is shown by Steck and Day, J. Am. Chem. Soc. 65, 452 (1943). The use of some 2-aryl-1H-phenanthro[9,10-d]imidazoles in luminescent systems is shown by O. Neunhoeffer and B. Krieg, Z. Naturforsch, 21B, 536 (1966).

Carrying out the above reactions in dimethyl sulfoxide gives improved yields and purities. It is a better solvent than the traditional glacial acetic acid.

Approximately equivalent amounts of the phenanthrenequinone and the aromatic aldehyde and an excess (10 to 15 moles) of ammonium acetate are used. The amount of dimethyl sulfoxide should be sufficient to provide good mixing of the reactants, preferably sufficient to dissolve the reactants and product during the reaction period.

A reaction temperature between 75° and 105°C., preferably between 85° and 95°C., is used. The heating is continued until the reaction is essentially completed.

Conventional methods can be employed to isolate the product.

A wide variety of phenanthro[9,10-d]azoles can be synthesized in dimethyl sulfoxide, including many which are luminescent, but not photochromic, and many of which are outside the scope of the present invention.

EXAMPLE 6

4-(5,10-Diphenyl-1H-phenanthro[9,10-d]imidazol-2-yl)benzophenone, Cyclic Ethylene Acetal

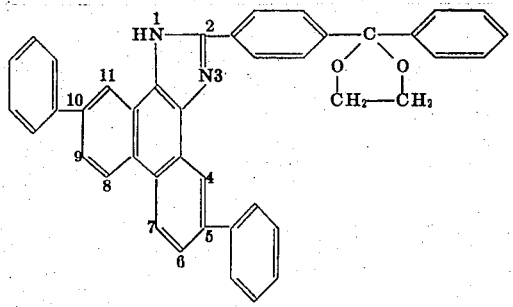

A mixture of 0.8 g. 2,7-diphenylphenanthrenequinone, 0.8 g. 4-formylbenzophenone cyclic ethylene acetal [i.e., 2-(p-formylphenyl)-2-phenyl-1,3-dioxolane], 10 g. ammonium acetate and 25 ml. dimethyl sulfoxide was heated at 95°–105°C. for 1 hour. The solution was cooled and diluted with water. The precipitate was recrystallized from benzene. The yield of 4-(5,10-diphenyl-1H-phenanthro-[9,10-d]imidazol-2-yl)benzophenone cyclic ethylene acetal, melting at 315°–318°C., was 85 percent.

I claim:

1. A phenanthroazole of the formula:

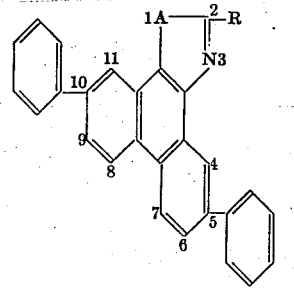

where A is imino or oxygen,
R is a carbocyclic aryl group of not more than three benzene rings selected from the group consisting of

| | |
|---|---|
| phenyl | 4-benzoylphenyl |
| the cyclic ethylene acetal of | nitrophenyl |
| tolyl | dinitrophenyl |
| ethylphenyl | acetylphenyl |
| butylphenyl | benzoylphenyl |
| pentylphenyl | acetamidophenyl |
| xylyl | diethylaminophenyl |
| trimethylphenyl | ethylsulfonylphenyl |
| vinylphenyl | phenylsulfonylphenyl |
| allylphenyl | (trimethylsilyl)phenyl |
| biphenylyl | (3-phenylpropyl)phenyl |
| anisyl | benzyloxyphenyl |
| ethoxyphenyl | dimethoxynaphthyl |
| butoxyphenyl | methylnaphthyl |
| bromophenyl | bromonaphthyl |
| chlorophenyl | nitronaphthyl |
| iodophenyl | anthryl |
| fluorophenyl | methoxyanthryl |
| dibromophenyl | methylanthryl |
| difluorophenyl | butylanthryl |
| cyanophenyl | chloroanthryl |
| naphthyl | phenanthryl | and dimethoxyphenanthryl radicals.

2. The compound according to claim 1 which is 2,5,10-Triphenyl-1H-phenanthro[9,10-d]imidazole.

3. The compound according to claim 1 which is 2,5,10-Triphenylphenanthro[9,10-d]oxazole.

4. The compound according to claim 1 which is 4-(5,10-diphenyl-1H-phenanthro[9,10-d]imidazol-2-yl)benzophenone, cyclic ethylene acetal.

5. The compound 2-phenyl-5,10-bis(3-hexylphenyl)-1H-phenanthro[9,10-d]imidazole.

* * * * *